Sept. 28, 1926.
D. S. BAZEMORE
COTTON CHOPPER
Filed April 29, 1926
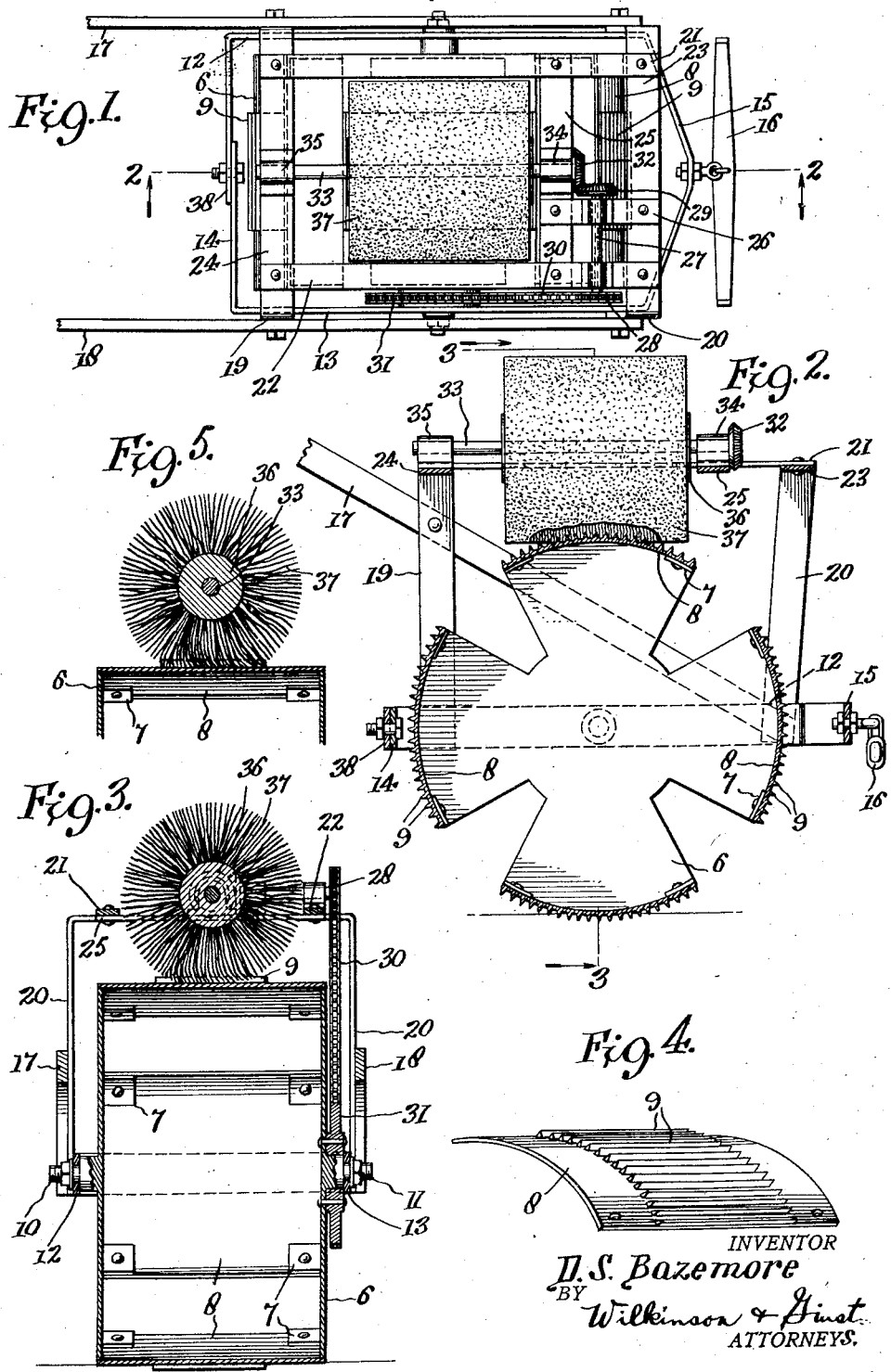
INVENTOR
D. S. Bazemore
BY Wilkinson & Finst
ATTORNEYS.

Patented Sept. 28, 1926.

1,601,667

UNITED STATES PATENT OFFICE.

DANIEL S. BAZEMORE, OF TAMPA, FLORIDA.

COTTON CHOPPER.

Application filed April 29, 1926. Serial No. 105,535.

The present invention relates to improvements in cotton choppers and consists in certain improvements over the device shown and described in my prior U. S. Patent No. 1,369,604, granted February 22, 1921.

An object of the present invention is to provide an improved cotton chopper in which the cutting blades will be kept free at all times from accumulations of the soil and other foreign substance which impair the effectiveness of the blades in weeding out the cotton.

Another object of the invention is to provide a more effective implement in which the construction is simple, inexpensive and durable and which will serve to do the work of a number of laborers, thus decreasing the cost of this work.

With the foregoing and other objects in view, the invention will be described in detail hereinafter, and referred to more particularly in the sub-joined claims.

The invention will be described in connection with the accompanying drawings, in which like parts are referred to by the same reference characters, and in which—

Figure 1 is a top plan view of an improved cotton chopper constructed according to the present invention;

Figure 2 is a central vertical section taken on the line 2—2 in Figure 1;

Figure 3 is a cross section taken on the line 3—3 in Figure 2;

Figure 4 is a perspective view showing one of the drum segments; and,

Figure 5 is a fragmentary cross section through the brush and a cutting blade showing a slight modified form of apparatus.

Referring more particularly to the drawings, 6 designates generally the drum which follows to some extent the form of drum shown in my prior patent aforesaid, except that instead of providing five segments, I find it more advantageous to use four such segments of slightly greater circumferential length and being spaced apart by narrow gaps. This arrangement enables me to provide the segments in pairs disposed diametrically opposite one another and in general, yields a more symmetrical drum.

The drum 6 is preferably made up of the two headers having the inturned perforated lugs 7 to which the sector plates 8 are riveted, bolted, or otherwise secured. One such plate is illustrated in Figure 4, the plate being preferably of metal and molded or otherwise formed so as to produce thereon the series of corrugated cutting blades 9, such blades being preferably of subsantially triangular form and tapering outwardly to sharp cutting edges, such cutting edges running transversely of the device. The blades will be of suitable depth and length, but preferably shorter in length than the lengths of the sector plates 8 in order to leave at the opposite ends of the blades spaces for the attachment of the plates to the drum headers.

The drum is mounted for rotation upon the trunnions 10 and 11, extending from the drum headers or spiders and such trunnions are mounted in appropriate bearings in the side beams 12 and 13, forming a portion of the framework of the machine. These side beams are connected at their opposite ends by the cross beams 14 and 15. These various parts form a rectangular frame which may be in one piece of band metal or other appropriate material. The frame is supported by the drum and the device is drawn along by one or more draft animals hitched to the singletree 16. The handles for the device are indicated at 17 and 18 and these handles are attached at their forward ends to the side beams 12 and 13 and incline upwardly and rearwardly, intermediate portions of the handles being secured to the upright posts 19 which are erected at the rear portion of the rectangular framework and secured thereto. There are also front posts 20 erected at the forward portion of the rectangular framework and these posts support a superposed supplementary brush rectangular framework composed of the longitudinal or side rails 21 and 22 connected together at their ends by the cross rails 23 and 24. The side rails 21 and 22 are also connected by an intermediate transverse rail 25 and between this transverse rail 25 and the front end rail 23 is a brace 26. On this brace 26 and on the side rail 22 are mounted bearings for a countershaft 27 having the sprocket 28 on its outer end and the beveled gear wheel 29 on its inner end. The sprocket 28 receives the chain 30 which extends about a second sprocket 31 mounted on and turning with the drum, its trunnion or axle.

The beveled gear wheel 29 meshes with a similar complemental gear wheel 32 on the brush shaft 33 which latter is mounted in the forward bearing 34 carried on the intermediate rail 25 and the rear bearing 35 mounted on the rear end rail 24.

The brush may be of any appropriate construction, preferably consisting of the core 36 and the fiber 37 radiating therefrom. These bristles may be fitted in and secured to the core in any appropriate manner. The bristles are preferably flexible and the axis of the brush extends longitudinally of the machine, while the axis of the drum extends transversely of the machine. The two axes in other words, are at substantially right angles. The brush is mounted above the drum and its bristles wipe transversely through the transversely extending troughs between the blades of the drum, whereby to clean the same. In Figure 5 the bristles are shown as being bent by engagement of their tip portions with the sector plate. This places the bristles under tension and enables them to sweep from one end of the teeth or corrugations to the other, thus most thoroughly cleaning the troughs from end to end.

The brush is driven from the drum and the drum rotates in contact with the soil, thus cutting and weeding out the excess plants, leaving only those necessary for good cultivation.

The main under frame is made in one piece of bar metal having its ends brought together and overlapped at the rear portion, as indicated at 38 in Figure 1. These overlapped ends may be held together in any appropriate manner and by undoing the fastening, the ends and sides may be sprung apart to dismantle the apparatus and disengage the drum.

The parts may be made of appropriate material and it will be understood that these parts may be made in suitable sizes, shapes and dimensions and the gaps in the drum may be of suitable circumferential length. I reserve the right to make the device according to any dimensions and to make such other and further changes and modifications as fall within the scope of the following claims.

Having thus described my invention, what I claim and desire to secure by Letters Patent of the United States, is:—

1. An improved cotton chopper comprising a land roller having transversely extending corrugations, a frame for drawing said roller carried by the roller, and a movable brush carried by said frame and arranged to wipe lengthwise of the transverse corrugations of the drum.

2. An improved cotton chopper comprising a soil engaging roller having transversely extending corrugations, a frame for drawing the roller supported upon said roller, a brush supported by said frame with its axis extending substantially in the line of draft and having bristles adapted to wipe through the transverse corrugations of the roller, and means to drive said brush.

3. An improved cotton chopper comprising a land engaging roller having transverse corrugations and teeth, a frame carried by said roller, a supplementary frame supported above said first-mentioned frame, a brush mounted for rotation in said second frame above the roller and adapted to rotate transversely with respect to the roller, said brush having bristles adapted to wipe against said teeth and through the corrugations, and means for rotating said brush by a movement derived from the rotation of said roller.

4. An improved cotton chopper comprising a land roller having transversely extending corrugations and alternate teeth, a draft frame supported by the roller, a supplementary frame in superposed relation to the draft frame, a rotary brush carried by the supplementary frame with its axis extending at substantially right angles to the turning axis of the roller, said brush having numerous flexible bristles adapted to extend into the corrugations, and mechanical means coupled between said roller and brush for turning the brush on movement of the roller.

DANIEL S. BAZEMORE.